United States Patent
Cohen et al.

(10) Patent No.: US 9,846,522 B2
(45) Date of Patent: Dec. 19, 2017

(54) ALIGNABLE USER INTERFACE

(71) Applicant: MICROSOFT TECHNOLOGY LICENSING, LLC, Redmond, WA (US)

(72) Inventors: David Cohen, Nesher (IL); Sagi Katz, Yokneam Ilit (IL); Dani Daniel, Haifa (IL); Giora Yahav, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 488 days.

(21) Appl. No.: 14/338,768

(22) Filed: Jul. 23, 2014

(65) Prior Publication Data

US 2016/0026342 A1 Jan. 28, 2016

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/012* (2013.01); *G06F 3/013* (2013.01);
(Continued)

(58) Field of Classification Search
CPC combination set(s) only.
See application file for complete search history.

(56) References Cited

U.S. PATENT DOCUMENTS

| 8,159,458 B2 | 4/2012 | Quennesson |
| 2009/0268944 A1 | 10/2009 | Matsuoka et al. |

(Continued)

FOREIGN PATENT DOCUMENTS

| EP | 2613224 A2 | 7/2013 |
| WO | 2013038293 A1 | 3/2013 |

OTHER PUBLICATIONS

Magee, et al., "Towards a multi-camera mouse-replacement interface", In Proceedings of the 10th International Workshop on Pattern Recognition in Information Systems, Jun. 2010, 10 pages.
(Continued)

*Primary Examiner* — Hien Duong
(74) *Attorney, Agent, or Firm* — Alleman Hall Creasman & Tuttle LLP (57) ABSTRACT

Embodiments are disclosed that relate to interacting with a graphical user interface in a manner to facilitate hands-free operation. For example, one disclosed embodiment provides a method including outputting to a display device a user interface that displays graphical representations of a plurality of alignable user interface objects, each alignable user interface object representing a selectable object. The method further includes receiving depth data from an imaging device, the image data capturing an image of a face directed toward the display device. The method further comprises changing an alignment condition of a first user interface object of the plurality of alignable user interface objects to move the first user interface object into an aligned condition, and changing an alignment condition of a second user interface object to move the second user interface object out of an aligned condition based on the received image data.

20 Claims, 5 Drawing Sheets

(51) Int. Cl.
*G06F 3/01* (2006.01)
*G06F 3/0481* (2013.01)
*G06F 3/0484* (2013.01)
*G06K 9/00* (2006.01)

(52) U.S. Cl.
CPC ...... *G06F 3/04815* (2013.01); *G06F 3/04842* (2013.01); *G06K 9/00248* (2013.01)

(56) References Cited

U.S. PATENT DOCUMENTS

| | | | |
|---|---|---|---|
| 2010/0064259 | A1 | 3/2010 | Alexanderovitc et al. |
| 2010/0080464 | A1* | 4/2010 | Sawai ..................... G06F 3/012 382/190 |
| 2012/0032882 | A1 | 2/2012 | Schlachta et al. |
| 2012/0256967 | A1 | 10/2012 | Baldwin et al. |
| 2012/0257035 | A1 | 10/2012 | Larsen |
| 2013/0241925 | A1* | 9/2013 | Konami ................. G06T 15/08 345/419 |
| 2013/0304479 | A1 | 11/2013 | Teller et al. |
| 2013/0321265 | A1 | 12/2013 | Bychkov et al. |
| 2014/0092142 | A1 | 4/2014 | Boelter et al. |
| 2014/0210705 | A1* | 7/2014 | Kim ...................... G06F 3/0485 345/156 |
| 2015/0220259 | A1* | 8/2015 | Ban ....................... G06F 3/0486 715/746 |

OTHER PUBLICATIONS

Park, et al., "Gaze-directed hands-free interface for mobile interaction", In Proceedings of the 14th international conference on Human-computer interaction: interaction techniques and environments—vol. Part II, Jul. 9, 2011, 2 pages.

Francone, et al., "Using the User's Point of View for Interaction on Mobile Devices", In Proceedings of 23th French speaking Conference on Human-Computer Interaction, Oct. 24, 2011, 9 pages.

IPEA European Patent Office, Second Written Opinion issued in PCT Application No. PCT/US2015/041049, Jun. 16, 2016, WIPO, 8 pages.

ISA European Patent Office, International Search Report and Written Opinion issued in Application No. PCT/US2015/041049, dated Oct. 7, 2015, WIPO, 10 pages.

IPEA European Patent Office, International Preliminary Report on Patentability Issued in PCT Application No. PCT/US2015/041049, dated Nov. 2, 2016, WIPO, 9 pages.

* cited by examiner

ALIGNABLE USER INTERFACE

BACKGROUND

Graphical user interfaces are commonly used to allow users to control computing device software and hardware functions. A position signal, such as a computer mouse signal, a touch screen or touch pad input, etc., may be used in combination with a selection input mechanism (e.g. a button on the mouse) to receive inputs. Further, visual feedback may be displayed to facilitate user interactions with the graphical user interface, for example, by illustrating which graphical user interface item of a plurality of displayed items is currently selectable.

SUMMARY

Embodiments are disclosed that relate to interacting with a graphical user interface in a way that may facilitate hands-free operation. For example, one disclosed embodiment provides a method including outputting to a display device a user interface that displays graphical representations of a plurality of alignable user interface objects, each alignable user interface object representing a selectable object. The method further includes receiving depth data from an imaging device, the image data capturing an image of a face directed toward the display device. The method further comprises changing an alignment condition of a first user interface object of the plurality of alignable user interface objects to move the first user interface object into an aligned condition, and changing an alignment condition of a second user interface object to move the second user interface object out of an aligned condition based on the received image data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, feedback may be provided on a graphical user interface to facilitate interactions with the graphical user interface. For example, a graphical user interface may display a graphical user interface menu as a list of items, and may indicate a currently selectable menu item by highlighting the selectable item or otherwise visually distinguishing the selectable menu item from other displayed menu items. Such a graphical user interface may be suited well for mouse-based interactions, touch-based interactions, or other such interaction modes.

However, such a user interface may not be well suited for a hands-free user interface that utilizes face-based interactions for a graphical user interface, as such interactions may lack the precision of mouse-based or touch-based position signals. Thus, embodiments are disclosed herein that relate to the presentation of user interfaces that facilitate hands-free interactions using face and/or eye location determinations as position signals. As described below, the disclosed embodiments, in some circumstances, may allow for the definite and unambiguous identification of a user's intent to select a specific graphical user interface object, even where the system does not utilize eye gaze projection based upon pupil tracking for precise position signals.

Briefly, the disclosed user interfaces utilize displayed graphical representations of alignable user interface objects in different states of alignment, where each alignable user interface object represents a selectable object with which a user can interact. As a determined line of sight of a user's face changes (which may or may not be based upon pupil tracking), the computing device may track the changes, and change the display of the alignments of the alignable user interface objects such that one of the alignable user interface objects is brought into an aligned condition. By observing which user interface object is in an aligned condition (e.g., as evidenced by the aligned condition of the associated graphical representations of the user interface objects), the user can see which targeted user interface object is currently selectable. The disclosed embodiments may thus allow for intuitive user interface interactions in a hands-free manner.

Figure 1:
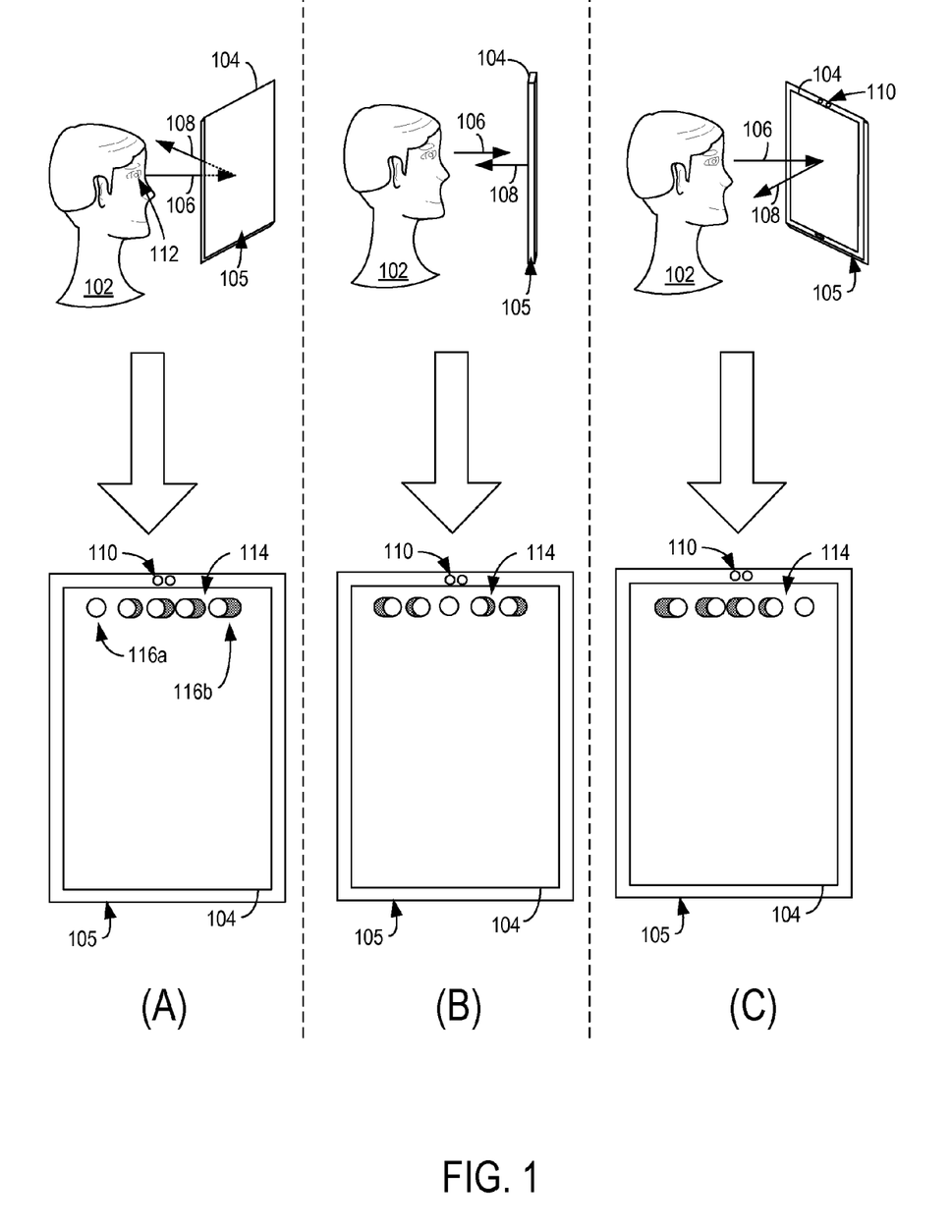
FIG. 1 shows an example graphical user interface that includes alignable user interface objects, and illustrates a user interaction with the graphical user interface.

FIG. 1 shows an example of an interaction with a display device presenting a graphical user interface menu according to one implementation. First, in position (A), a face of a user 102 has a first angle relative to a display device 104 of a computing device 105. The angle is illustrated by an offset between a face vector 106 extending outward from the face of the user and a display screen normal 108. While the display device 104 is depicted as a display for a tablet device (e.g. in which display device 104 is integrated into computing device 105), it will be understood that the disclosed embodiments may be used with any other suitable display device, including but not limited to an integrated display for a tablet, laptop, smartphone, head-mounted display device, and other wearable and/or portable devices. Further, in some implementations, a display device used to display a graphical user interface may be separate from a computing device and communicatively connected thereto as a peripheral device (e.g., a monitor for a desktop computer, a television communicatively coupled to a desktop computer, video game console, and/or other home entertainment device, etc.).

Face vector 106 may be determined in any suitable manner. For example, in some implementations, face vector 106 may be determined by imaging the face with a depth imaging device 110 and mapping the features of the face based on the depth data from the depth imaging device to determine a direction in which the face is pointed. As illustrated, depth imaging device 110 may include a projector (e.g., for projecting infrared light) and a sensor. Depth imaging device 110 may represent any suitable depth imaging device (e.g., a time of flight depth camera, a structured light depth camera, an ultrasound imaging device, a stereoscopic camera, etc.) positioned and adapted to generate depth images of a face of a user of the display device 104. While depicted as being integrated into computing device 105, it will be understood that the depth imaging device 110 may take any other suitable form, and may be a standalone device located remotely from the display device 104 and/or a computing device that provides display output to the display device in some implementations.

In addition to the face vector, depth imaging device 110 also may be utilized to determine an eye coordinate associated with one or more eyes 112 of the face of user 102. The eye coordinate may represent a three-dimensional coordinate of one or both eyes of the user relative to the display 104 as determined from the depth image data. Based on the eye coordinate and the face vector determined, a line of sight may be determined that extends from a determined location on the user's face (e.g. a location of one of the user's eyes, a location between the two eyes of the user, etc.) in a direction of the face vector. This may allow the determination of an estimate of a line of sight without utilizing pupil tracking.

The depicted user interface 114 includes a plurality of graphical representations of alignable user interface objects, such as alignable user interface objects 116a and 116b. Each alignable user interface object may represent a selectable object. Each alignable user interface object may have an alignment condition associated therewith, such that it is selectable when in an aligned condition. The displayed orientation of each alignable user interface object may be determined in any suitable manner. For example, a virtual camera may be defined in user coordinate space having origin at eye coordinate and z-axis in direction of line of sight, and the orientation of each alignable user interface object may be determined based upon this virtual camera position. In the depicted embodiment the alignable user interface objects take the form of virtual tubes as viewed from the virtual camera perspective, but may take any other suitable form that has different appearances at different orientations. For example, the alignable user interface objects may include two dimensional renderings of volumetric geometric shapes such as cubes or pyramids, two dimensional objects that can be put into spatial alignment (e.g. each alignable object includes two or more two dimensional shapes of equal shape and size, such that they appear as one when in the aligned condition), objects that form a recognizable character when in the aligned condition (e.g. parts of letters that that appear as a recognizable letter only when in the aligned condition), etc.

In position (A) of user interface 114 of FIG. 1, user interface object 116a is depicted in an aligned condition, and the other user interface objects (e.g., user interface object 116b) are in unaligned conditions. In this example, the line of sight of the user in position (A) of FIG. 1 is aligned with a user interface object (and/or graphical representation associated therewith) positioned on a left side of the display (e.g., user interface object 116a).

Next, in position (B) of FIG. 1, face vector 106 is parallel with a screen normal 108 of display device 104, as the face of the user is directed toward a center of the display device (e.g., the display device is not angled relative to the face of the user). Accordingly, the line of sight of the user in position (A) of FIG. 1 is aligned with a user interface object (and/or graphical representation associated therewith) positioned in a center of the display. In response to such alignment, a center user interface object may be in an aligned condition, while the other user interface objects are in an unaligned condition, as shown in the user interface 114 displayed in response to position (B).

Next, in position (C) of FIG. 1, the face of the user 102 is angled relative to display device 104 toward an opposite side of display 104 relative to position (A). Thus, a determined line of sight of the user (which is parallel with face vector 106) is directed toward a right side of the display device and aligned with a user interface object (and/or graphical representation associated therewith) positioned on a right side of the display. In response to such alignment, a rightmost user interface object may be in an aligned condition, while the other user interface objects are in an unaligned condition.

It will be understood that the user interface objects and associated graphical representations illustrated in FIG. 1 are examples, and that any suitable user interface object and associated graphical representation, as well as any displayed configuration indicating various aligned and unaligned conditions, may be presented without departing from the scope of this disclosure. As mentioned above, the illustrated user interface objects and associated graphical representations take the form of a hollow cylindrical object with easily distinguishable differences in appearance between the aligned and unaligned conditions. In other examples, any other suitable representation of a two- or three-dimensional user interface object may be displayed such that a viewing angle of the three-dimensional projection changes with the line of sight of the user.

Figure 2:
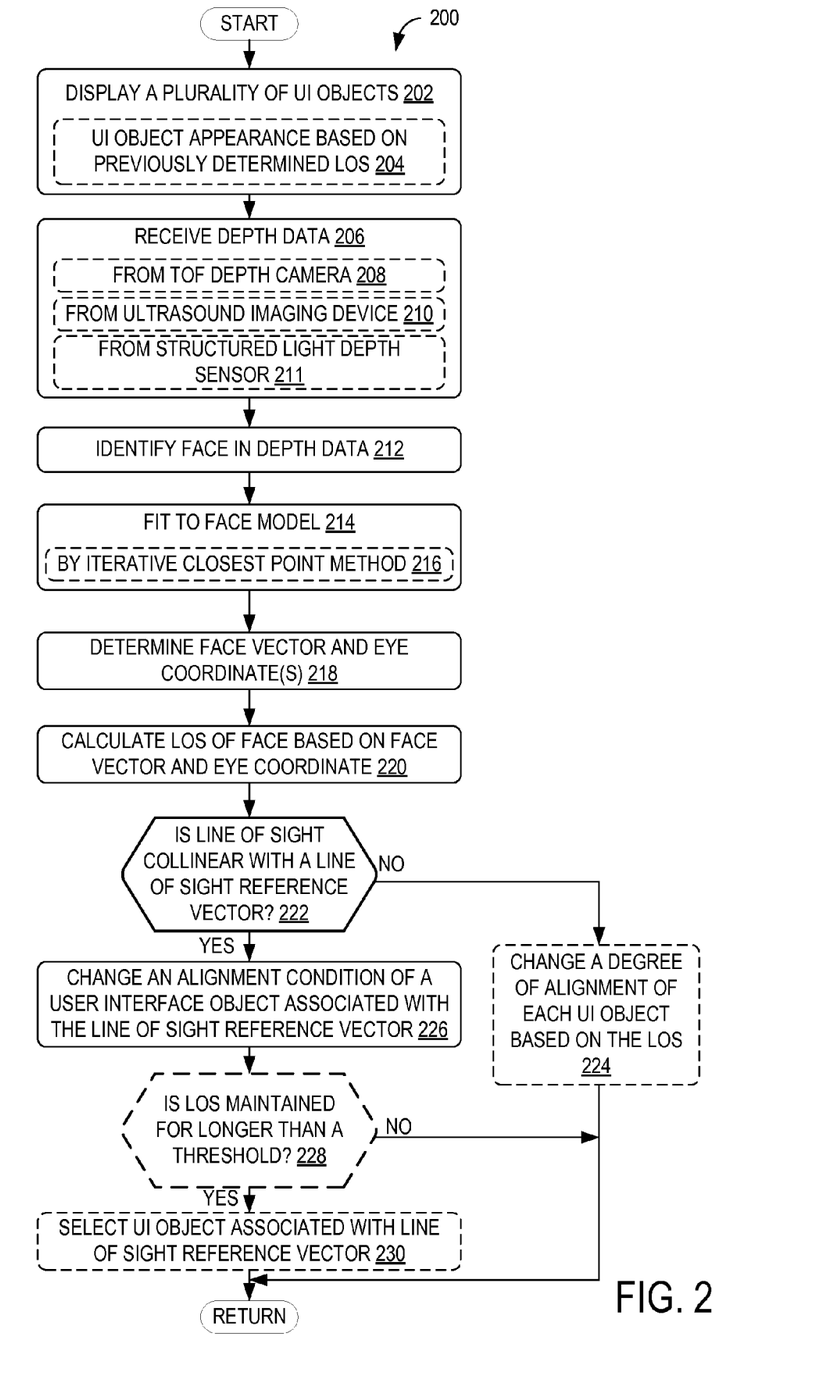
FIG. 2 is a flow chart illustrating an example method for providing visual feedback for a user interaction with a graphical user interface having alignable user interface objects.

FIG. 2 shows a flow diagram depicting an example of a method 200 for providing visual feedback via a graphical user interface menu that is output by a computing device to a display device. At 202, method 200 includes displaying a plurality of user interface objects to form a graphical user interface menu. As indicated at 204, the appearance and/or graphical representations of the user interface objects may be based on a determined line of sight of a user of the display device. For example, method 200 may be performed iteratively such that each pass through updates the user interface from a previous state. In some examples, a default appearance of user interface objects and/or associated graphical representations may be presented upon initiation of the user interface, in response to a detection of a new face, and/or in response to turning on the device.

At 206, method 200 includes receiving depth data from a depth imaging device (e.g., from depth imaging device 110 of FIG. 1). For example, the depth data may include data received from a time of flight camera, as indicated at 208, an ultrasound imaging device, as indicated at 210, a structured light depth sensor 211, and/or any other suitable depth imaging device. The depth image data may provide depth information for objects located within a field of view of the depth imaging device.

At 212, method 200 includes identifying a face in the depth image data. If multiple faces are detected, a primary face (e.g., a face to be tracked and utilized during the execution of method 200) may be determined based on the location, size, orientation, clarity, and/or other parameters associated with each face relative to the other faces in the field of view of the imaging device.

At 214, the identified face is fit to a face model to determine features and/or orientation of the face. As one example, the face may be fit to the model using an iterative closest point method (e.g., matching each point of the identified face to a closest point in a face model), as indicated at 216. It is to be understood that any suitable mechanism(s) may be utilized to determine features and/or orientation of the face.

At 218, method 200 includes determining a face vector and eye coordinate(s) associated with the identified face. For example, using the model to which the face is fit, the locations of features indicating a directionality/orientation of the face (e.g., a location/direction of a nose, a location of eyes/nose/mouth relative to one another and/or an overall shape of the imaged face, etc.) may be determined to indicate a direction toward which a front/center of the face is pointing. The eye coordinate may be determined by identifying the location of one or more eyes in the face in the three-dimensional plane imaged by the depth imaging device (e.g., using the face model to which the face is mapped and/or based on identifying features of the eyes). If only one eye of a face is imaged, the coordinate of the other eye may be estimated based on the position of the imaged eye and/or other detected facial features.

At 220, method 200 includes calculating a line of sight (LOS) of the face based on the face vector and eye coordinate determined at 218. For example, an LOS may be calculated by positioning a vector at a center point of an eye and/or between the two eyes of the face and directing the vector in the direction of the face vector (e.g., such that it is parallel to the face vector).

Figure 3A:
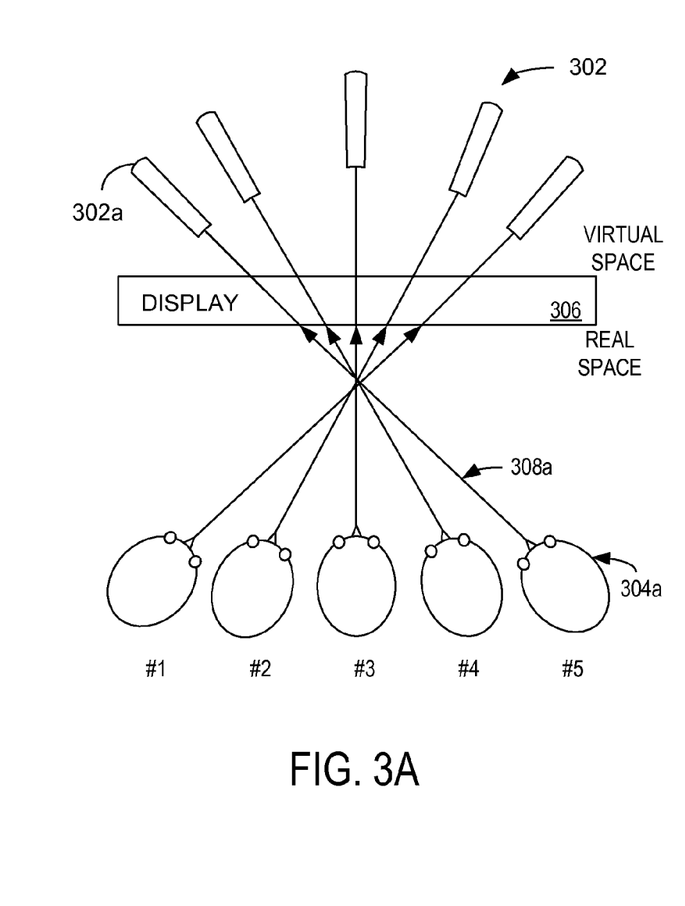
FIGS. 3A & 3B show a schematic example of virtual line of sight reference vectors usable for providing visual feedback for user interaction with a graphical user interface.
Figure 3B:
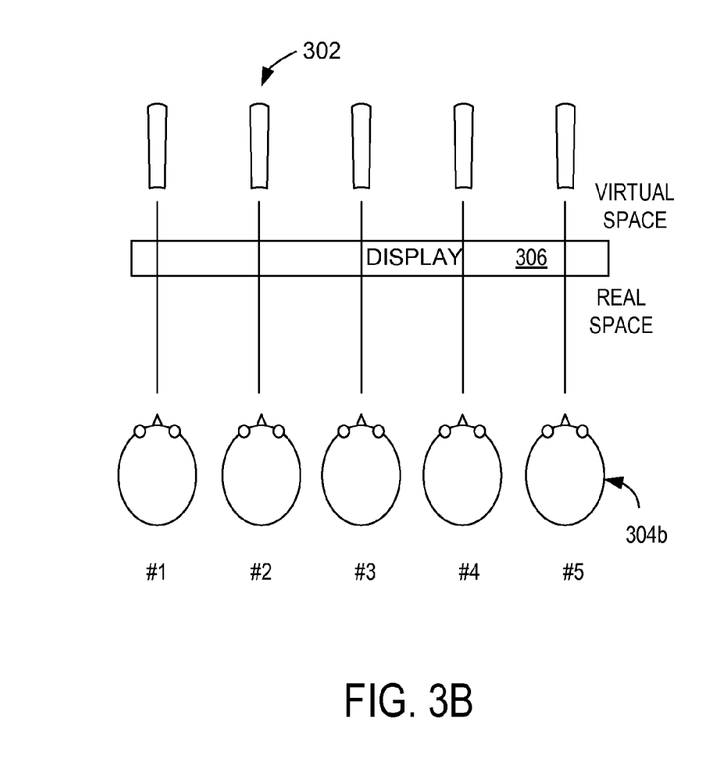

At 222, method 200 includes determining if the LOS is collinear with a line of sight reference vector (e.g. within a threshold degree of collinearity). The line of sight reference vector may comprise, for example, a virtual object that extends into virtual space (e.g., "behind" the display device) and is positioned and/or oriented based on a location of a selected user interface object. In other words, the line of sight reference vectors each define a line that passes through a user interface object and a selected volume in space. The volume may be fixed and/or may rotate in space in response to changes in a line of sight of a face. The virtual object may be presented on the display as the graphical representation of the user interface object with an appearance that is based on the line of sight of a face relative to the line of sight reference vector. Turning briefly to FIGS. 3A and 3B, example line of sight reference vectors 302 are illustrated. In FIG. 3A, five different orientations of face 304a relative to a display 306 are illustrated. Each face 304a has an associated line of sight 308a directed toward display 306. The line of sight reference vectors 302 may be positioned such that each of the lines of sight associated with the illustrated poses of face 304a is collinear with a corresponding line of sight reference vector. For example, the line of sight for the face at pose #5 may be collinear with line of sight reference vector 302a. Accordingly, the graphical representation of the user interface object associated with line of sight reference vector 302a (e.g., a user interface object positioned on a far left side of display 306) may appear as though the user is viewing the object through a channel that is aligned with the object. The other user interface objects, which are aligned with the other line of sight reference vectors, may be oriented in ways that do not allow the user to "look through" the user interface object, thereby clearly distinguishing the selectable and unselectable user interface objects.

In the example illustrated in FIG. 3A, the line of sight reference vectors may be spaced from one another at a first end (e.g., away from display 306) and converge toward one another at a second end (e.g., toward display 306 and/or an eye coordinate associated with face 304a). In this way, a user may interact with the user interface through translation and rotation of the user's head and/or device, as illustrated by the different locations and orientations of face 304a in each illustrated pose. FIG. 3B shows another example in which the line of sight reference vectors are spaced from one another and parallel to one another. In the example of FIG. 3B, each of the line of sight reference vectors may align with one of the faces 304b having different positions relative to one another. In such an embodiment, the user may interact with the user interface by translating the device displaying the user interface (or moving his/her head sideways), rather than rotating the device and/or head, to change the alignment conditions of the displayed user interface objects. In yet other embodiments, a user may interact through both rotation and translation of the head and/or device. It is to be understood that any suitable arrangement of line of sight reference vectors may be utilized, and that the line of sight vectors may take any suitable form.

Returning to FIG. 2, if the line of sight of the face is not collinear with a line of sight reference vector (e.g., "NO" at 222), then method 200 may comprise, at 224, changing a degree of alignment of each user interface object and/or associated graphical representation based on the line of sight of the face. For example, the graphical representations illustrated in FIG. 1 show different degrees of alignment for graphical representations that are not aligned with a line of sight of a face (e.g., a right-most graphical representation is "more" unaligned than the next graphical representation to the left in user interface 114 displayed in response to position (A)).

In some implementations, each line of sight reference vector may have an associated alignment tolerance region, such that the line of sight of a face may be considered to be aligned with that line of sight reference vector, and thus in the aligned condition, if the LOS falls within that alignment tolerance region. The alignment tolerance region may allow a range of lines of sight to be aligned with a given line of sight reference vector (and associated user interface object). Accordingly, the line of sight falling within the alignment tolerance region may be an example of meeting an aligned condition in some embodiments. In some examples, the alignment of the alignable user interface objects may be displayed to snap to a nearest alignment condition when the face vector does not align with any one line of sight reference vector, while in other examples the alignable user interface objects may rotate continuously with changes in the face vector, rather than snapping to a displayed alignment condition.

Continuing with method 200, if the line of sight is collinear with a line of sight reference vector (e.g., "YES" at 222), then method 200 comprises, at 226, changing (or maintaining, if aligned with the same reference vector as determined in an immediately prior iteration of the method) an alignment condition of a user interface object associated with the line of sight reference vector. For example, the alignment condition may be changed from unaligned to aligned, or from aligned to unaligned. It is to be understood that the determination that the line of sight is collinear with a line of sight reference vector may correspond to the line of sight falling within an alignment tolerance region of the line of sight reference vector, as described above.

As mentioned above, a user interface object in an aligned condition may be selectable to perform a computing device function. For example, based upon the comparison of the line of sight to the line of sight reference vector, selection of a selectable user interface object that is associated with a line of sight reference vector determined to meet a condition of alignment with respect to the line of sight may be enabled for selection. Any suitable type of user input may be used to select a user interface object. As one example, maintenance of an aligned condition for a threshold amount of time may be used to select a user interface object that is in the aligned condition. Thus, at 228, method 200 may include determining if a line of sight of the face is maintained (e.g., if the alignment condition is maintained) for longer than a selection threshold. If the line of sight is not maintained (e.g., "NO" at 228), then method 200 may return. On the other hand, if the line of sight is maintained for longer than the selection threshold (e.g., "YES" at 228), the method may proceed to 230 to select (or confirm selection of) the user interface object associated with the line of sight reference vector.

It is to be understood that the selection described at 228 and 230 of method 200 may be performed by completing multiple iterations of method 200 and determining if an alignment condition of a user interface object is maintained at "aligned" for a threshold number of consecutive iterations of the method. Upon selecting the user interface object, an action associated with the object may be performed/executed by the computing device. Any suitable selection mechanism may be utilized to select the user interface object. Examples include, but are not limited to, mechanical actuators (e.g. via buttons), touch sensors (e.g. via static touch or touch gesture), motion sensors (e.g. via gestures detected by accelerometers gyroscopes, and/or image sensors, such as nodding a head, winking, etc.), acoustic sensors (e.g. by voice command), and/or any other suitable input mechanism.

Figure 4:
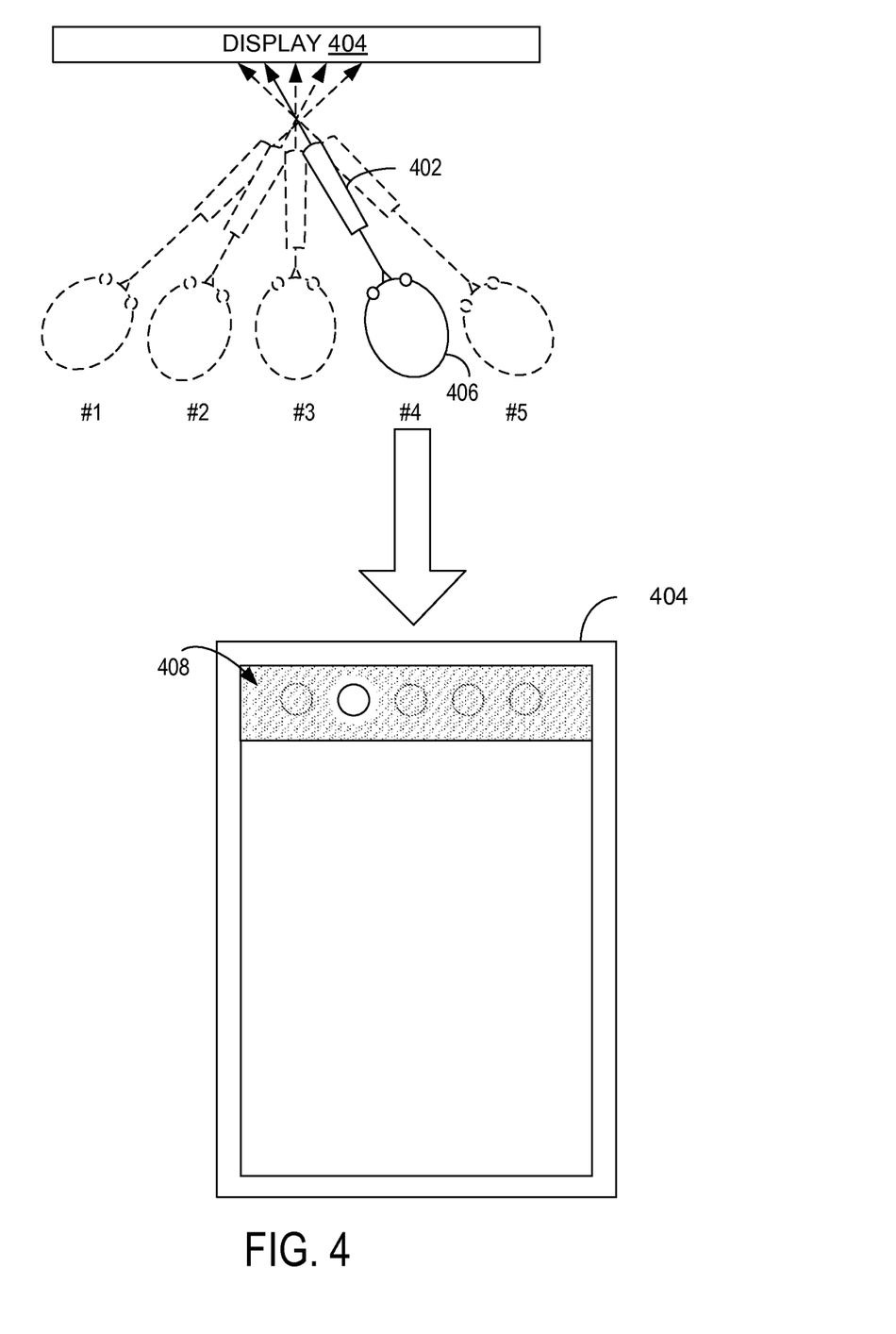
FIG. 4 shows an example arrangement of another virtual line of sight reference vector for providing visual feedback for user interaction with a graphical user interface.

FIG. 4 shows another example of a line of sight reference vector and associated graphical user interface. As illustrated, a single line of sight reference vector 402 may be virtually projected such that it appears to extend in front of a display 404 and toward a face 406. While the examples illustrated in FIGS. 3A and 3B show different line of sight vectors for each user interface object, the example illustrated in FIG. 4 includes a single line of sight reference vector that is rotated around a pivot point and/or positioned to align with a line of sight of a face. A user interface 408 may have an appearance representing the user's view of the user interface and/or a region of the user interface through the line of sight reference vector (e.g., through a hollow region in the center of the line of sight reference vector). For example, as illustrated, each region of the user interface 408 (e.g., each region relating to a particular selectable menu) may be shaded except for a user interface object that is aligned with the line of sight of face 406.

The examples described above may help to provide an intuitive user interface that changes alignment conditions of graphical representations of alignable user interface objects as a line of sight of a user's face changes, thereby providing easily understood visual feedback when trying to select a user interface object. Accordingly, even without a dedicated eye-tracking system utilizing corneal glint light sources and eye tracking cameras, an intuitive, hands-free user interface may be provided for dynamic user interaction with a computing device.

In some examples, the methods and processes described herein may be tied to a computing system of one or more computing devices. In particular, such methods and processes may be implemented as a computer-application program or service, an application-programming interface (API), a library, and/or other computer-program product.

Figure 5:
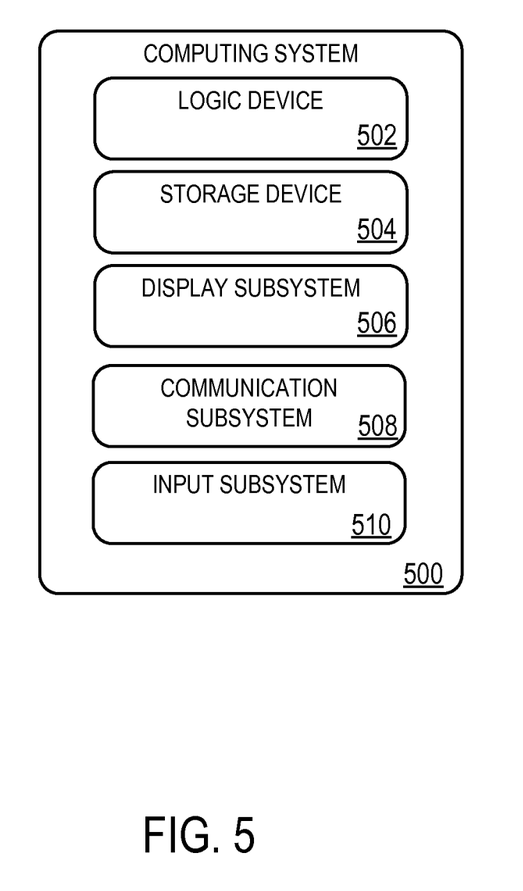
FIG. 5 shows a block diagram of an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, tablet computers, home-entertainment computers, network computing devices, gaming devices, mobile computing devices, mobile communication devices (e.g., smart phone), server computers, and/or other computing devices.

Computing system 500 includes a logic device 502 and a storage device 504. Computing system 500 may optionally include a display subsystem 506, subsystem 508, input subsystem 510, and/or other components not shown in FIG. 5.

Logic device 502 includes one or more physical devices configured to execute instructions. For example, the logic device may be configured to execute machine-readable instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 504 includes one or more physical devices configured to hold instructions executable by the logic device to implement the methods and processes described herein. When such methods and processes are implemented, the state of storage device 504 may be transformed—e.g., to hold different data.

Storage device 504 may include removable and/or built-in devices. Storage device 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 504 may include volatile, nonvolatile, dynamic, static, read/write, read-only, random-access, sequential-access, location-addressable, file-addressable, and/or content-addressable devices.

It will be appreciated that storage device 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 502 and storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 506 may be used to present a visual representation of data held by storage device 504. This visual representation may take the form of a graphical user interface (GUI). For example, the display subsystem 506 may provide instructions to an associated display device (e.g., display device 104 of FIG. 1) to display a graphical user interface (e.g., graphical user interface 114 of FIG. 1). As the herein described methods and processes change the data held by the storage device, and thus transform the state of the storage device, the state of display subsystem 506 may likewise be transformed to visually represent changes in the underlying data. Display subsystem 506 may include one or more display devices utilizing virtually any type of technology. Such display devices may be combined with logic device 502 and/or storage device 504 in a shared enclosure, or such display devices may be peripheral display devices.

When included, communication subsystem 508 may be configured to communicatively couple computing system 500 with one or more other computing devices. Communication subsystem 508 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for providing visual feedback for a user interaction with a graphical user interface menu that is output by a computing device to a display device, the method comprising:
   outputting to the display device a user interface that displays graphical representations of a plurality of alignable user interface objects, each alignable user interface object representing a selectable object;
   receiving depth data from an imaging device, the depth data including image data capturing an image of a face directed toward the display device; and
   changing an alignment condition of a first user interface object of the plurality of alignable user interface objects to display the first user interface object as moved in an aligned condition, and changing an alignment condition of each remaining user interface object of the plurality of alignable user interface objects to display each remaining user interface object as out of the aligned condition, based on the image data received, wherein the aligned condition comprises a line of sight reference vector of the first user interface object being within a threshold degree of collinearity with a line of sight of the face determined from the depth data.

2. The method of claim 1, wherein the imaging device includes a time of flight depth camera.

3. The method of claim 1, wherein the imaging device includes an ultrasound device.

4. The method of claim 1, further comprising determining the line of sight of the face using a face vector and an eye coordinate.

5. The method of claim 4, further comprising comparing the line of sight to a plurality of line of sight reference vectors, each of the plurality of line of sight reference vectors having a different position relative to one or more other of the plurality of line of sight reference vectors, and each of the plurality of line of sight reference vector being associated with a corresponding selectable user interface objects.

6. The method of claim 5, wherein the alignment condition of the first user interface object is changed in response to the comparing the line of sight to the plurality of line of sight reference vectors.

7. The method of claim 4, further comprising aligning a line of sight reference vector with the line of sight of the face, the line of sight reference vector being rotatable about a virtual pivot point, and wherein the alignment condition of the first user interface object is changed in response to the line of sight reference vector being directed toward the first user interface object.

8. A computing system for providing visual feedback of user interaction with the computing system, the computing system comprising:
   a display device;
   a depth imaging device;
   a logic device; and
   a storage device storing instructions executable by the logic device to
      send to the display device a user interface for display, the user interface comprising a plurality of selectable user interface objects;
      receive depth data from the depth imaging device;
      from the depth data, determine a line of sight of a face imaged in the depth data;
      compare the line of sight to a plurality of line of sight reference vectors, each of the plurality of line of sight reference vectors having a different position relative to one or more other of the plurality of line of sight reference vectors, and each of the plurality of line of sight reference vector being associated with a corresponding selectable user interface object of a plurality of alignable user interface objects; and
      based at least in part upon comparing the line of sight to the plurality of line of sight reference vectors, change an alignment condition of the selectable user interface object that is associated with the line of sight reference vector to display the selectable user interface object as moved into in an aligned condition, change an alignment condition of each remaining user interface object of the plurality of alignable user interface objects to display each remaining user interface object as out of the aligned condition, and enable selection of a selectable user interface object that is associated with a line of sight reference vector determined to meet a condition of alignment within a threshold degree of collinearity with the line of sight.

9. The computing system of claim 8, the instructions further executable to select the selectable user interface object that is associated with the line of sight reference vector determined to meet the condition of alignment with respect to the line of sight and executing an action associated with the selectable user interface object selected.

10. The computing system of claim 9, wherein selecting the selectable user interface object comprises detecting that the line of sight remains aligned with the line of sight reference vector determined to meet the condition of alignment with respect to the line of sight for a threshold amount of time.

11. The computing system of claim 9, wherein each of the plurality of the line of sight reference vectors each define a line that passes through a user interface object and a selected volume in space.

12. The computing system of claim 11, wherein the selected volume is fixed in space.

13. The computing system of claim 11, wherein the selected volume rotates in space in response to changes in the line of sight of the face.

14. The computing system of claim 9, wherein the plurality of line of sight reference vectors are arranged in parallel with one another.

15. The computing system of claim 9, wherein the plurality of line of sight reference vectors are spaced from one another at a first end and converge toward one another at a second end and toward an eye coordinate.

16. The computing system of claim 9, the instructions further executable to define a virtual camera in user coordinate space having origin at eye coordinate and z-axis in direction of line of sight.

17. The computing system of claim 16, the instructions further executable to display feedback over menu items in a form of two dimensional representations of virtual tubes as viewed from a perspective of the virtual camera.

18. A computing system for providing visual feedback for a user interaction with a graphical user interface menu, the computing system comprising:
    a display device;
    a depth imaging device;
    a logic device; and
    a storage device storing instructions executable by the logic device to
        output to the display device a user interface that displays graphical representations of a plurality of alignable user interface objects, each of the plurality of alignable user interface object representing a selectable object;
        receive depth data from an imaging device, the depth data capturing an image of a face directed toward the display device;
        detect a change in an orientation of a face relative to the display device based on the depth data;
        based at least in part upon the change in the orientation of the face, change a displayed perspective of each of the plurality of alignable user interface object to bring a first of the plurality of alignable user interface objects into an aligned condition and to change an alignment condition of each remaining user interface object of the plurality of alignable user interface objects to display the respective user interface object as moved out of the aligned condition, wherein the aligned condition comprises a line of sight reference vector of the first alignable user interface object being within a threshold degree of collinearity with a line of sight;
        while the first of the plurality of alignable user interface objects is in the aligned condition, receive a selection input; and
        in response to the selection input, take an action on the computing system based upon a selectable user interface object that is associated with the first of the plurality of alignable user interface objects.

19. The computing system of claim 18, the instructions further executable to fit the image of the face to a face model based on the depth data received, and wherein determining the orientation of the face is based at least in part upon a determination of a face vector and an eye coordinate derived from the face as fit to the face model.

20. The computing system of claim 18, wherein the instructions to receive a selection input comprises instructions to determine that the orientation of the face is maintained for a duration that is longer than a selection threshold.

* * * * *